United States Patent [19]
von Bonin et al.

[11] Patent Number: 5,288,429
[45] Date of Patent: * Feb. 22, 1994

[54] PROCESS FOR THE PRODUCTION OF MOULDINGS

[75] Inventors: Wulf von Bonin, Odenthal-Hahnenberg; Ulrich von Gizycki, Leverkusen, both of Fed. Rep. of Germany

[73] Assignee: Bayer Aktiengesellschaft, Leverkusen, Fed. Rep. of Germany

[*] Notice: The portion of the term of this patent subsequent to Mar. 10, 2009 has been disclaimed.

[21] Appl. No.: 885,090

[22] Filed: May 18, 1992

[30] Foreign Application Priority Data

May 25, 1991 [DE] Fed. Rep. of Germany ....... 4117077

[51] Int. Cl.$^5$ .............................................. C04B 14/00
[52] U.S. Cl. ................. 252/378 R; 423/448; 264/45.2
[58] Field of Search ................. 252/378 R; 106/38.28, 106/692; 264/45.2, 298, 300; 423/448

[56] References Cited

U.S. PATENT DOCUMENTS

| | | | |
|---|---|---|---|
| 4,102,960 | 7/1978 | Borkowski | 252/378 R |
| 4,199,628 | 4/1980 | Caines | 252/378 R |
| 4,244,934 | 1/1981 | Kondo et al. | |
| 5,094,780 | 3/1992 | von Bonin | |

FOREIGN PATENT DOCUMENTS

| | | |
|---|---|---|
| 0445400 | 9/1991 | European Pat. Off. . |
| 0458150 | 11/1991 | European Pat. Off. . |
| 2430720 | 1/1976 | Fed. Rep. of Germany . |
| 4007060 | 9/1991 | Fed. Rep. of Germany . |
| 2424240 | 11/1979 | France . |

OTHER PUBLICATIONS

Satou et al. "Fiber Reinforced Graphite Gasket, and Method of Manf" (Sep. 3, 1985) App. No. 58-182562 (JP 60-73171).

Kawai "Production of Expanded Graphite Easy to Mold" (Jul. 19, 1980) Appl. No. 53-136130 JP 55-62806.

Patent Abstracts of Japan, V. 5, No. 31 (Feb. 1981) JP:55-158115.

Primary Examiner—Mark L. Bell
Assistant Examiner—Paul Marcantoni
Attorney, Agent, or Firm—Sprung Horn Kramer & Woods

[57] ABSTRACT

In an advantageous process for the production of mouldings from expandable graphite, a liquid is first added to the expandable graphite and the resulting moist preparation form of the expandable graphite is heated in moulds to temperatures above 180° C.

10 Claims, No Drawings

PROCESS FOR THE PRODUCTION OF MOULDINGS

The present invention relates to a particularly advantageous production of mouldings from expandable graphites.

It is known that mouldings having low bulk densities can be produced by introducing expandable graphite into closed moulds and heating it therein to temperatures above 180° C.

Under these circumstances, the expandable graphite expands and fills the mould. However, this process has the disadvantage that the expandable graphite, which is present in flaky form, can only cover relatively long expansion distances in complicated moulds with difficulty. Consequently, the moulds are only incompletely filled during expansion, the resulting mouldings have very different bulk densities at different points and the walls of the moulds are subjected to different pressures, which may cause deformations of the mould.

A process for the production of mouldings from expandable graphite has now been found which is characterised in that a liquid is added to expandable graphite and the moist preparation form of the expandable graphite thus obtained is heated in moulds to temperatures above 180° C.

Suitable expandable graphites for the present invention are graphites of any type which are expandable on heating. They may be solid, swollen or already partly expanded and may expand, for example, by 10 to 800 per cent by volume or more. Such expandable graphites (for example so-called graphite acids and graphite salts) are known. They are in general graphites in whose inter-stitial planes foreign atoms, ions or molecular groups are incorporated. Preferred graphites are so-called $NO_x$ and $SO_x$ expandable graphites which can be prepared by the action of sulphuric or nitric acid on graphite, optionally in the presence of an oxidising agent (for example $H_2O_2$). Suitable expandable graphites can optionally also be obtained by an electrochemical method.

The expandable graphites can be used as such, in (partly) neutralised form and/or together with auxiliaries. The auxiliaries may be, for example, oxidation stabilisers (such as phosphates, borates, phosphoric acids, boric acids, esters thereof and amides thereof), pH standardising agents (for example bases or base donors) and/or binders. Suitable binders are, for example, soluble metal phosphates, metal phosphonates and metal phosphonate precursors, as described in German Offenlegungsschrift 3,912,552, but also ammonium and amine salts, preferably (poly)alkylenepolyamine salts and alkanolamine salts (for example ethanolamine salts) of phosphoric acids (for example $H_3PO_4$), boric acids or of acidic phosphates of metals of the second and third groups of the Periodic Table of Elements and the additives described further below, provided that they have binder properties.

The expandable graphites can be used in compact form.

However, they are preferably preexpanded, that is to say they have already been expanded to part of their expansion capacity, but not completely, by heating to temperatures below 600° C., preferably to 180° to 400° C.

The expandable graphites may have, for example, average maximum particle diameters of 0.05 to 15 mm, preferably from 0.5 to 5 mm.

The expandable graphites can also be used as a mixture with other, expandable or nonexpandable additives. Additives may be, for example: perlites, vermiculites, expandable glasses, micas, clays, borosilicates, cokes, charcoals, hard coals, brown coals, graphite granules, cork granules, wood granules, cereal grains, cork, bark granules, expandable clay, foamed concrete, metal sponge, pumice, tuff and/or lava.

In the case of the moist preparation form of the expandable graphite, which form is prepared according to the invention, it is also possible to add fillers and reinforcing agents, which are then particularly uniformly distributed.

The fillers and reinforcing agents which may optionally also be additives may be, for example, fibres, crystallites, lamellae, dumbbells, spheres, hollow spheres, powders and/or granules of very different types, for example metal powders, metal chips, metal filaments, ground rocks, glasses, enamel frits, chalk, dolomite, kaolin, quartz, oxides and hydroxides of calcium, of magnesium, of aluminium and of iron, phosphates, silicates, aluminates, cements, gypsums, slags, fly ashes, coals, cokes, cellulose, bone, wood, bark, fruit, fruit peel, hay and straw comminution products and fruit bodies of maize, millet and cereals of very different types.

Additives may be present as a mixture with expandable graphite in total amounts of, for example, from 0 to 85% by weight, preferably from 15 to 60% by weight. All possible combinations of two or more of these substances from one category and all possible combinations of two or more of these substances from different categories are also possible.

The moist preparation form of the expandable graphite, which form is to be prepared according to the invention, is preferably produced from expandable graphite and water or from expandable graphite and aqueous solutions or dispersions of phosphates, polyphosphates and/or borates of metals, amines and/or ammonia, oxides, hydroxides, carboxylates, silicates of magnesium, calcium, aluminium, zinc, iron, sodium and/or potassium, coals, cokes, bituminous products of coal and/or oil refinining, carbohydrates, polymers, proteins, thickeners and/or surfactants.

It is an essential feature of the present invention that a liquid is added to the expandable graphite and a moist preparation form of the expandable graphite is thus obtained. Preferred liquids for the production of the moist preparation form of the expandable graphite are water or water-containing liquid mixtures. Water-containing liquid mixtures may be, for example, aqueous solutions, emulsions, dispersions or suspensions. In addition to water, such a mixture may contain, for example, organic solvents, such as ketones, alcohols and amines and/or esters and amides of organic and inorganic acids, and/or organic and/or inorganic salts, such as salts of the various sulphuric and phosphoric acids, borates, silicates, aluminates, formates, maleates, acetates, citrates and oleates, and/or nonionic, cationic and anionic monomers, oligomers and polymers, such as carbohydrates (for example molasses, sugars, starches, celluloses and derivatives thereof), hydrocarbons and derivatives thereof (for example tar, bitumin, fats and waxes), glycols, polyols, polyethers, polyesters, natural and synthetic polyamides, proteins, caseins, chitins, natural and synthetic rubbers or other elastomers, homo-and copolymers of unsaturated hydrocarbon compounds (for example polymer and plastics dispersions known per se), polyurethanes, phenol resins, furan resins, urea resins, melamine/formaldehyde resins, epoxy resins, unsaturated polyester resins, polysulphide resins and/or polyimide resins.

Water-containing mixtures which can be used for the production of the moist preparation form of the expandable graphite may also contain several of the stated materials. Mixtures which have a certain adhesive and thickening effect, for example aqueous mixtures which contain molasses, cellulose derivatives, starch, polyvinyl acetate hydrolysis products, acrylamide polymers or bitumen, are particularly preferred.

If water-containing mixtures are used for the production of the moist preparation form of the expandable graphite, care should be taken to ensure that such mixtures have a liquid character before being combined with expandable graphite. In other words, water-miscible liquid substances may be present in any amount, liquid substances which exhibit little or no miscibility with water are preferably emulsified in water, water-soluble solid substances are preferably used at the most in amounts corresponding to their solubility and solid substances which exhibit little or no solubility in water are preferably used as a dispersion or finely divided suspension in water.

The moist preparation form of the expandable graphite is preferably produced using water or water-containing mixtures which contain, for example, not less than 2% by weight of water. Such water-containing mixtures particularly preferably contain 20 to 99.5% by weight of water.

One or more different such mixtures may be used.

According to the invention, the expandable graphite is converted into a moist preparation form. This is effected, as described above, by adding a liquid. The amount of the liquid may differ very greatly from case to case. It may vary, for example, depending on the particle size and degree of expansion of the expandable graphite to be moistened and on the type of materials concomitantly used. Advantageously, the amount of liquid to be used is chosen in the individual case so that, on the one hand, the expandable graphite, optionally as a mixture with auxiliaries, binders, additives, fillers and/or reinforcing agents, no longer produces dust and is no longer completely free-flowing properties and, on the other hand, the total batch retains the liquid without signs of running. The moist preparation form of the expandable graphite is preferably a paste or moist granules.

The moist preparation form of the expandable graphite is preferably introduced into a mould for the production of mouldings, or, if it has already been prepared in the mould, is distributed therein, in such a way that sufficiently expandable graphite is present in all parts of the mould in order to fill the mould everywhere after expansion and to give a more or less uniform density distribution in the finished moulding. The moist preparation form of the expandable graphite generally adheres sufficiently firmly to the mould so that, prior to the expansion process, there are generally no significant distribution changes, in particular no further flowing together at the deepest point of the mould, even if the mould is oriented essentially vertically or is removed before the expansion process.

Closed moulds which however permit the escape of gases were advantageously used.

Steel has proved to be a suitable material for the mould for heating the expandable graphite. However, other materials are also suitable for this purpose, in particular other metals and glass, ceramic and plastics. The latter are preferred if heating is to be carried out by means of microwaves.

It is generally advantageous to provide the mould walls with release agents, for example with talc, graphite, starch solutions, aluminium or copper foils, paper, cotton fabrics or nonwoven viscose staple fabrics.

Heating itself may be effected, for example, by radiation, inductively, by alternating current voltage, by heating liquids or heating gases, for example in an oven in which the mould which contains the moist preparation form of the expandable graphite is placed.

Heating for expansion of the preferably still moist expandable graphite is carried out to temperatures above 180° C. Heating is usually carried out to temperatures of not more than 900° C., preferably to temperatures of not more than 800° C. In general, good results can be obtained with expansion temperatures between 200° and 800° C. The $SO_x$ and $NO_x$ expandable graphites which are preferably to be used have generally reached their maximum expansion at 600° C. If it is intended to produce mouldings which as such are still expandable, it is advantageous to effect expansion at temperatures of less than 400° C.

The mouldings thus obtainable have bulk densities of, for example, 0.01 to 0.6 g/cm$^3$, preferably of 0.05 to 0.45 g/cm$^3$. The bulk density may be varied by appropriate filling of the mould.

The mouldings which can be produced according to the invention from expanded expandable graphite or mixtures containing this can be used where low weight has to be combined with high heat stability, good electrical conductivity, good electromagnetic shielding, advantageous fire characteristics and/or mechanical stability. Examples which may be mentioned are: vehicle construction, aircraft construction, rocket construction, furniture construction, container construction, fire prevention, apparatuses for moderate current and/or heat removal, supply and transmission, apparatuses for heat insulation and sound insulation, the construction of heating systems and heat exchanger apparatuses, the construction of plants which are resistant to chemicals and shock-absorbing apparatuses and the construction of apparatuses for the reflection and/or absorption of electromagnetic waves.

The process according to the invention has a number of advantages. It permits the production of mouldings from expandable graphite and mixtures containing expandable graphite without the expandable graphite particles having to cover long expansion distances. Even in complicated moulds, it is possible to ensure that the moulds are completely filled before and/or after the expansion process. The bulk density distribution of the mouldings thus produced and, hence the isotropy of the properties of these mouldings, is greatly improved in comparison with mouldings which were produced by conventional methods. The process according to the invention also makes it possible to distribute a large number of any desired additives relatively uniformly in the mixture to be expanded. Since the moist preparation form of the expandable graphite can be applied to the surfaces of the mould in such a way that the said graphite adheres to the said surfaces, the expandable graphite does not flow away.

EXAMPLES

The invention is illustrated by way of example below. The parts and percentages stated relate to the weight, unless stated otherwise.

A commercial $SO_x$ expandable graphite which had an average maximum particle diameter of 2.5 mm, an expandability of more than 500% by volume and a sulphur content of 2.9% by weight and a bulk density of 700 g/l was used as expandable graphite in the examples.

EXAMPLE 1

A mould for a half round pipe section having a wall thickness of 1 cm and a length of 50 cm was produced from 8 mm steel sheet, said mould having a capacity of 1000 ml. This mould was lined with aluminium foil, and 100 g of expandable graphite was distributed uniformly along the central generating line of the horizontal semi-cylinder. The mould was then closed, heated to 600° C. in the horizontal position in a preheated oven and then left to cool, and the mould was then opened. In the moulding thus produced, it was found that the expanding expandable graphite had in parts not risen as far as the lateral ends of the half round pipe section, starting from the generating line. In the edge regions along the two outer lines of the half round section, the moulding had a bulk density of only 0.01 to 0.07 $g/cm^3$, where any expandable graphite at all reached there, whereas about the density was more than 0.25 $g/cm^3$ along the central generating line.

The experiment was repeated, except that the expandable graphite was made into a paste beforehand with 50 ml of 5% strength by weight aqueous starch solution. After the mould had been opened, it was found that the mould for the half round pipe section had been completely filled. The bulk density was now 0.05 to 0.1 g $cm^3$ along the outer lines of the mould whereas the density no longer exceeded 0.16 $g/cm^3$ along the central line.

This shows that substantially improved uniformity of the bulk density distribution in the moulding is achieved in the procedure according to the invention.

EXAMPLE 2

The waste gas pipe of a heat machine has a diameter of 3.5 cm and, for design reasons, has a wavy shape. It was surrounded at a distance of 1.8 cm by a casing which is in two parts in the longitudinal direction and consists of 0.2 mm thick steel sheet. The resulting wavy intermediate space was to be filled over a distance of about 60 cm in length.

This was carried out using the expandable graphite mentioned at the outset, which had been preexpanded by heating to 250° C. and now had a bulk density of 100 g/l. The very light and dusty expandable graphite could not be introduced into the intermediate space in a technically simple manner to fill said space. 70% of a 25% strength neutral ethanolamine phosphate solution in water, to which a few drops of commercial household surfactant had been added were therefore added and gently mixed with the additives. A pasty mass was obtained and was introduced uniformly into the two halves of the casing. The filled part casings were then placed around the wavy waste gas pipe without material losses and without handling difficulties and were combined so that the join between the half casings and the flange part between surrounding casing and waste gas pipe permitted the emergence of vapours and gases. The construction prepared in this manner was then introduced into an oven preheated to 600° C. and was removed again after this temperature had been reached and was left to cool.

After removal of the steel sheet casings, it was found that the treated part was completely surrounded by expanded graphite was firmly applied and constituted a self-supporting insulating element. This had a thermal conductivity of 7 W/K.m and had sound-insulating properties.

EXAMPLE 3

500 parts of expandable graphite were mixed with 186 parts of an 80% strength aqueous solution of the reaction product of 1 mol of aluminium hydroxide and 3 mol of phosphoric acid in a kneader. 60 parts of ethanolamine were then added with kneading, a neutralisation reaction taking place with heating. The moist product obtained was comminuted in a hammer mill to a particle diameter of 0.5 to 2 mm. Moist granules of coated expandable graphite were thus obtained, the coating consisting of the amine phosphate formed. The moist granules had a water content of 5.5% and possessed a ratio of expandable graphite to phosphate of 70 : 30 parts.

100 g of these granules were placed in a steel sheet mould having a capacity of 1 l and lined with aluminium foil and were processed to give a 2 cm thick sheet by placing the mould in the horizontal position in an oven and heating it to 600° C. After cooling, the moulding was removed from the mould, the aluminium foil was peeled off and the total bulk density of the sheet was determined as 0.09 g $cm^3$. The sheet was then sawn in the middle to give two sheets having half the thickness and the bulk density of these two sheets was determined. This too was 0.09 $g/cm^3$ (for both sheets). For comparison, an analogous experiment was carried out, except that only dry expandable graphite was used instead of the moist granules. The bulk densities of the two sheet halves differed in this case by 0.02 $g/cm^3$, that is to say by about 20%.

EXAMPLE 4

The granules obtained according to Example 3 were heated to about 216° C. in a slowly stirred vessel, the resulting preexpansion being interrupted when the granules had reached a bulk density of 100 g/l. 100 parts of these preexpanded granules were mixed with 20 parts of iron oxide black pigment and 20 parts of dolomite powder and then made into a paste with 50 parts of water. A non-free-flowing and non-dusty mass which was readily distributed between two 100 g $cm^2$ nonwoven viscose staple fabrics and thus gave a so-called sandwich was obtained. This sandwich was flexible, could be handled without material loss and was compacted between two inductively heated metal sheets at 550° C. to give a dimensionally stable sheet by residual expansion.

EXAMPLE 5

100 parts of an expandable graphite preexpanded to a bulk density of 50 g/l were mixed with 200 parts of a 15% strength solution of commercial sodium waterglass and introduced into a 2 l sheet mould for the production of 2 cm thick sheets, which mould was lined with sulphate kraft paper. The closed mould was placed in an oven and heated there to 600° C. After cooling, a dimensionally stable sheet which had a bulk density of 0.065 g/cm$^3$ was obtained.

The experiment was repeated but the sodium waterglass solution was replaced once with a 30% strength ammonium phosphate solution and once with a 30% strength cationic bitumen emulsion. In these two cases too, dimensionally stable sheets having bulk densities of about 0.06 g/cm$^3$ were obtained. Such sheets can be used for insulation purposes and for shielding against electromagnetic fields.

I claim:

1. A process for the production of mouldings from expandable graphite, in which water or a water-containing liquid is added to expandable graphite to form a moist preparation containing not less than 2% wt. water and the resulting moist preparation form of the expandable graphite is heated in moulds to temperatures above 180° C. to expand it within the mould.

2. The process of claim 1, in which the expandable graphite used is $NO_x$ exapndable graphite.

3. The process of claim 1, in which the expandable graphite used is $SO_x$ expandable graphite.

4. The process of claim 1, in which the expandable graphite used is pre-expanded.

5. The process of claim 1, in which the expandable graphite is used together with an auxiliary selected from the group consisting of oxidation stabilizers, pH standarizing agents, binders and combinations thereof.

6. The process of claim 1, in which the expandable graphite is used as a mixture with perlite, vermiculite, expandable glass, mica, clay, borosilicate, coke, charcoal, coal, graphite granules, wood granules, cereal grains, cork, bark granules, foamed concrete, metal sponge, pumice, tuff and/or lava.

7. The process of claim 1, in which the expandable graphite is used as a mixture with additives, the amounts of additives being 0 to 85% by weight, relative to the mixture.

8. The process of claim 1, in which the moist preparation form of the expandable graphite is produced from expandable graphite and water or from expandable graphite and aqueous solutions or dispersions of an additive selected from the group consisting of phosphates, polyphosphates or borates of metals, amines or ammonia; oxies, hydroxides, carboxylates or silicates of magnesium, calcium, aluminium, zinc, iron, sodium or potassium; coals, cokes, bituminous products of coal or oil refining; carbohydrates, proteins, thickeners, surfactants and combinations thereof.

9. The process of claim 1, in which the amount of liquid to be used for the production of the moist preparation form of the expandable graphite is chosen so that the expandable graphite, or its mixture with additives, no longer produces dust and is no longer completely free-flowing, and the total batch retains the liquid without signs of running.

10. Process of claim 1, in which the moist preparation form of the expandable is heated in moulds to temperatures of between 200° and 800° C.

* * * * *

UNITED STATES PATENT AND TRADEMARK OFFICE
CERTIFICATE OF CORRECTION

PATENT NO. : 5,288,429
DATED : February 22, 1994
INVENTOR(S) : Wulf Von Bonin, et al.

It is certified that error appears in the above-identified patent and that said Letters Patent is hereby corrected as shown below:

Column 8, line 15, cancel "oxies" and substitute --oxides--.

Signed and Sealed this

Eleventh Day of May, 1999

Q. TODD DICKINSON

Attest:

Attesting Officer

Acting Commissioner of Patents and Trademarks